United States Patent
Nishi

(10) Patent No.: US 7,554,603 B2
(45) Date of Patent: Jun. 30, 2009

(54) VIDEO-SIGNAL-PROCESSING DEVICE AND VIDEO-SIGNAL-TRANSFER METHOD

(75) Inventor: Tomohiro Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 749 days.

(21) Appl. No.: 11/293,109

(22) Filed: Dec. 5, 2005

(65) Prior Publication Data

US 2006/0119740 A1    Jun. 8, 2006

(30) Foreign Application Priority Data

Dec. 6, 2004    (JP) ............................ P2004-352746

(51) Int. Cl.
*H04N 9/77* (2006.01)
(52) U.S. Cl. .................. 348/450; 348/630; 348/453; 348/612; 348/663; 348/488
(58) Field of Classification Search .......... 348/488, 348/663, 444, 443, 453, 450, 459, 603, 609, 348/612, 617, 624, 630, 631, 683, 708, 702, 348/715; 386/17, 44
See application file for complete search history.

(56) References Cited

U.S. PATENT DOCUMENTS 7,474,355 B2 *   1/2009   Leone et al. ................ 348/453

2001/0010748 A1 *   8/2001   Murata et al. ................ 386/40

FOREIGN PATENT DOCUMENTS

JP    2003-348620    12/2003

OTHER PUBLICATIONS

D. H. Kelly, "Spatiotemporal Variation of Chromatic and Achromatic Contrast Threshold", Journal of the Optical Society of America, 64, 983-990, 1974.
K.T. Mullen, "The Contrast Sensitivity of Human Colour Vision to Red-Green and Blue-Yellow Chromatic Grating", J. Physiol., 359, 381-400, 1985.
Kato et al., "The Analysis of Camera Work and Sightline Movement of Broadcast Photographer Shooting Studio Program", The Journal of The Institute of Television Engineers of Japan, vol. 49, No. 8, pp. 1023-1031, 1995.

* cited by examiner

*Primary Examiner*—David L Ometz
*Assistant Examiner*—Jean W Désir
(74) *Attorney, Agent, or Firm*—Finnegan, Henderson, Farabow, Garrett & Dunner, L.L.P.

(57) ABSTRACT

A video-signal-processing device configured to externally transmit at least one brightness signal and at least one color-difference signal is provided. A single frame of the color-difference signal is assigned to a plurality of frames of the brightness signal so that a first frame frequency of the color-difference signal is lower than a second frame frequency of the brightness signal, where the first frame frequency is 24 Hz or higher. The brightness signal and the color-difference signal are transmitted so that a first center value on a first time base generated by the single frame of the color-difference signal becomes closest to a second center value on a second time base generated by the plurality of frames of the brightness signal corresponding to the color-difference signal.

9 Claims, 10 Drawing Sheets

VIDEO-SIGNAL-PROCESSING DEVICE AND VIDEO-SIGNAL-TRANSFER METHOD

CROSS REFERENCES TO RELATED APPLICATIONS

The present invention contains subject matter related to Japanese Patent Application JP 2004-352746 filed in the Japanese Patent Office on Dec. 6, 2004, the entire contents of which are incorporated herein by reference.

BACKGROUND OF THE INVENTION

1. Field of the Invention

The present invention relates to a video-signal-processing device and a video-signal-transfer method that can be used for producing a display image of a video signal generated based on the national television system committee (NTSC) system, for example. The present invention allows assigning a single frame of a color-difference signal to each of a plurality of frames of a brightness signal so that the center value on a time base generated by the single frame of the color-difference signal becomes closest to the center value on a time base generated by the plurality of frames of the brightness signal corresponding to the color-difference signal. Subsequently, it becomes possible to effectively avoid an unnatural display image of an edge and efficiently process a video signal with a high frame frequency by using a simple configuration.

2. Description of the Related Art

It has been known that the quality of a moving picture becomes high by increasing a frame frequency. However, where the frame frequency is increased without consideration, the information amount of a video signal transferred increases in proportion to the increased frame frequency. Therefore, there have been proposed methods for preventing the video-signal-information amount from being increased, so as to produce a moving picture with a high frame frequency.

For example, Japanese Unexamined Patent Application Publication No. 2003-348620 discloses a method for transmitting a brightness signal and a color-difference signal, where the frame frequency of the color-difference signal is decreased, so as to be lower than that of the brightness signal, increasing the decreased frame frequency of the color-difference signal by performing interpolation calculation on the reception side, and producing a display image of a video signal including the brightness signal and the color-difference signal. However, where the above-described interpolation calculation is performed for increasing the frame frequency of the color-difference signal, the configuration for achieving the interpolation calculation becomes complicated.

Accordingly, one and the same frame of the color-difference signal may be externally transmitted via a memory so that the frame frequency of the color-difference signal increases. The above-described method allows producing a high-quality object image as long as the object image is presented, as a still picture. However, where the object image is presented, as a moving picture, the edge of the object becomes significantly unnatural.

In each of FIGS. 11 and 12, an object image is shown by using a broken line and black circles, where the broken line indicates brightness signals and the black circles indicate color-difference signals. In FIG. 11, the frame frequency of the color-difference signal is the same as that of the brightness signal, and the object image is moved at a predetermined speed with time. Where an audience tracks the movement of the object image with his eyes, the object image is formed at a predetermined position on his retinas, as shown in FIG. 12. Subsequently, the audience can enjoy the moving object image without problems. Namely, in the case of FIGS. 11 and 12, the edge of the moving object image can be shown without problems.

However, where the color-difference signal is transferred for every three frames and displayed by repetitively transmitting one and the same frame, an object image presented on a display screen is moved intermittently for every three frames due to the above-described color-difference signal, as shown in FIG. 13 in comparison with FIG. 11. Subsequently, the object image generated by the color-difference signal is moved with a wave-like motion for every three frames with reference to a position recognized due to the brightness signal on the retinas of the audience tracking the movement of an object image generated by the brightness signal, as shown in FIG. 14 in comparison with FIG. 12.

In that case, therefore, the edge of the object image generated by the brightness signal becomes different from that of the object image generated by the color-difference signal, whereby both the edges blur. Further, the edge generated by the brightness signal and that generated by the color-difference signal are displaced from each other. If the frame frequency is low, the above-described blur and displacement are visually recognized, as a flicker.

SUMMARY OF THE INVENTION

Accordingly, the present invention provides a video-signal-processing device and a video-signal-transfer method that can effectively avoid an unnatural edge image and process a video signal with a high frame frequency with efficiency by using a simple configuration.

According to an embodiment of the present invention, there is provided a video-signal-processing device configured to externally transmit at least one brightness signal and at least one color-difference signal, where a single frame of the color-difference signal is assigned to a plurality of frames of the brightness signal so that a first frame frequency of the color-difference signal is lower than a second frame frequency of the brightness signal. The first frame frequency is 24 Hz or higher. The video-signal-processing device externally transmits the brightness signal and the color-difference signal so that a first center value on a first time base generated by the single frame of the color-difference signal becomes closest to a second center value on a second time base generated by the plurality of frames of the brightness signal corresponding to the color-difference signal.

Therefore, one and the same color-difference-signal frame is externally transmitted repetitively so that the first frame frequency of the color-difference signal increases and agrees with the second frame frequency of the brightness signal. Subsequently, the center value of an edge generated by the repetitively transmitted color-difference-signal frames agrees with the center value of an edge generated by the plurality of frames of the brightness signal corresponding to the color-difference signal. Therefore, it becomes possible to eliminate an unnatural display image generated by the edge displacement. Further, since the center position of the edge generated by the color-difference signal agrees with that of the edge generated by the brightness signal, it becomes possible to eliminate a blurred edge. Accordingly, it becomes possible to effectively avoid an unnatural edge image caused by a blurred edge and/or edge-position displacement, transfer a video signal with a high frame frequency, and produce a display image of the video signal with efficiency by using a simple configuration.

According to another embodiment of the present invention, there is provided a video-signal-processing device configured to process at least one brightness signal and at least one color-difference signal, where a single frame of the color-difference signal is assigned to a plurality of frames of the brightness signal so that a first frame frequency of the color-difference signal is lower than a second frame frequency of the brightness, signal. The first frame frequency is 24 Hz or higher and a first center value on a first time base generated by the single frame of the color-difference signal becomes closest to a second center value on a second time base generated by the plurality of frames of the brightness signal corresponding to the color-difference signal. The video-signal-processing device stores the color-difference signal in a memory, and reads and externally transmits the stored color-difference signal from the memory repetitively so that the single frame of the color-difference signal is repetitively assigned to the plurality of frames of the brightness signal corresponding to the color-difference signal. Subsequently, the first frame frequency of the color-difference signal agrees with the second frame frequency of the brightness signal.

The above-described configuration is provided on the reception side. On the reception side, the brightness signal and the color-difference signal with the frame frequency lower than that of the brightness signal are processed. Subsequently, it becomes possible to effectively avoid an unnatural edge image caused by a blurred edge and/or edge-position displacement, and efficiently process a video signal with a high frame frequency by using a simple configuration.

According to another embodiment of the present invention, there is provided a video-signal-processing device configured to receive and process at least one input-brightness signal and at least one input-color-difference signal, where a first frame frequency of the input-color-difference signal is equivalent to a second frame frequency of the input-brightness signal. The first frame frequency is 24 Hz or higher. Further, in the video-signal-processing device, a frame generated by using the input-brightness signal is interpolated so that a first center value on a first time base generated by a single frame of the input-color-difference signal becomes closest to a second center value on a second time base generated by a plurality of frames of the input-brightness signal corresponding to the input-color-difference signal. Subsequently, the second frame frequency of the input-brightness signal is increased and a brightness signal is generated. Further, the input-color-difference signal is stored in a memory, and read and externally transmitted from the memory repetitively so that the single frame of the input-color-difference signal is repetitively assigned to the plurality of frames of the brightness signal. Therefore, the first frame frequency of the input-color-difference signal agrees with the second frame frequency of the brightness signal, whereby a color-difference signal is generated.

Therefore, where a video signal generated based on the NTSC system is received and processed by the above-described configuration, it becomes possible to effectively avoid an unnatural edge image, generate a video signal with a high frame frequency, and process the video signal with efficiency, by using a simple configuration.

According to another embodiment of the present invention, there is provided a video-signal-transfer method adapted to transfer at least one brightness signal and at least one color-difference signal, where a single frame of the color-difference signal is assigned to a plurality of frames of the brightness signal so that a first frame frequency of the color-difference signal is lower than a second frame frequency of the brightness signal. The first frame frequency is 24 Hz or higher.

Further, the video-signal-transfer method includes the steps of externally transmitting the brightness signal and the color-difference signal so that a first center value on a first time base generated by the single frame of the color-difference signal becomes closest to a second center value on a second time base generated by the plurality of frames of the brightness signal corresponding to the color-difference signal, and externally transmitting the color-difference signal repetitively via a memory on a reception side so that the single frame of the color-difference signal is repetitively assigned to the plurality of frames of the brightness signal corresponding to the color-difference signal, so as to make the first frame frequency of the color-difference signal agree with the second frame frequency of the brightness signal.

Thus, it becomes possible to present a video-signal-transfer method that can effectively avoid an unnatural edge image, generate a video signal with a high frame frequency, transfer the video signal with efficiency, and produce a display image of the video signal by using a simple configuration.

The present invention allows effectively avoiding an unnatural edge image, generating a video signal with a high frame frequency, and processing the video signal with efficiency by using a simple configuration.

DESCRIPTION OF THE PREFERRED EMBODIMENTS

Hereinafter, embodiments of the present invention will be described in detail with reference to the attached drawings.

First Embodiment (1) Configuration of First Embodiment

Figure 2:
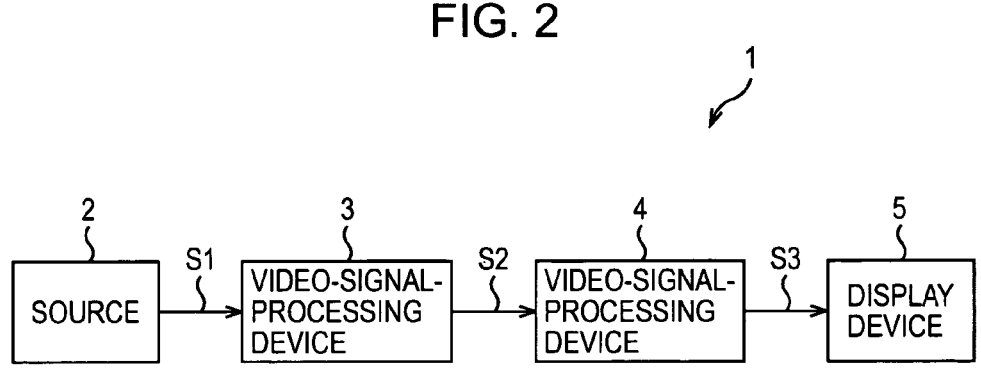
FIG. 2 is a block diagram illustrating the video-signal-transfer system.

FIG. 2 is a block diagram illustrating a video-signal-transfer system 1 according to an embodiment of the present invention. In the video-signal-transfer system 1, a video signal S1 transmitted from a source 2, where the video signal S1 includes a brightness signal Y and color-difference signals Cr and Cb, is processed by a video-signal-processing device 3. Subsequently, the frame frequency of each of the color-difference signals Cr and Cb is reduced, so as to be lower than that of the brightness signal Y. Then, the processed color-difference signals Cr and Cb, and the brightness signal Y are transmitted to a transfer path, as a video signal S2. Here, the transfer path may be a network including a wired and/or unwired broadcast network, the Internet, and so forth, and a recording medium including an optical disk or the like. Further, in the video-signal-transfer system 1, the video signal S2 is processed on the reception side via a video-signal-processing device 4 so that the frame frequency of each of the color-difference signals Cr and Cb is increased and correlated with that of the brightness signal Y. Then, the color-difference signals Cr and Cb, and the brightness signal Y are transmitted to a display unit 5, as a video signal S3 so that the display unit 5 produces a display image of the video signal S3.

Figure 1:
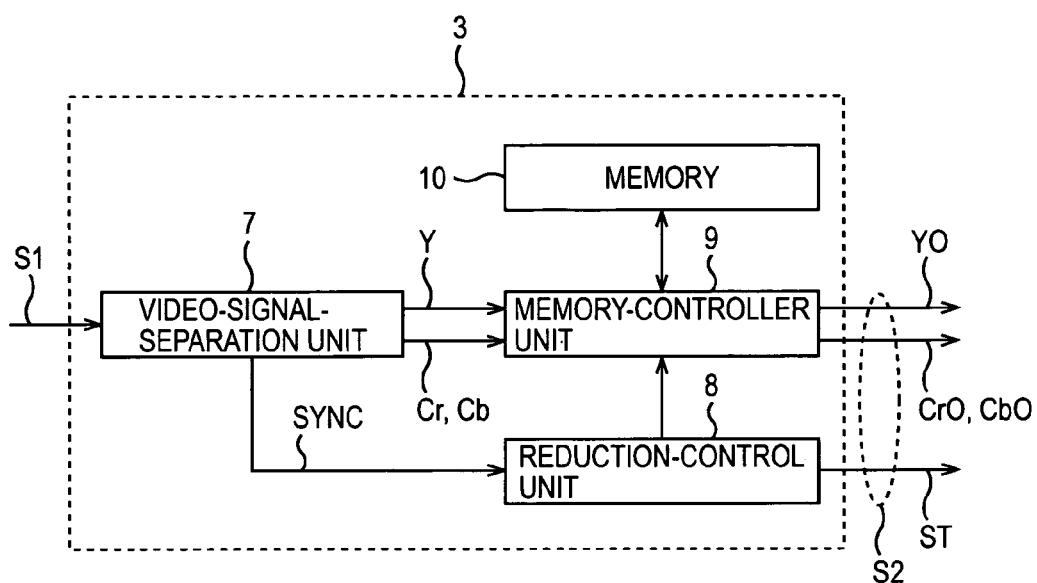
FIG. 1 is a block diagram illustrating a video-signal-processing device provided on the transmission side, where the video-signal-processing device is used for a video-signal-transfer system according to an embodiment of the present invention.

FIG. 1 is a block diagram illustrating the video-signal-processing device 3 on the transmission side relating to the video-signal-transfer system 1. The source 2 is provided, as a television camera configured to externally transmit an image-pickup result with a high frame frequency, for example. More specifically, the source 2 externally transmits the video signal S1, wherein each of the brightness signal Y, and the color-difference signals Cr and Cb has a frame frequency of 90 [Hz/sec] three times higher than that of a video signal generated based on the NTSC system. That is to say, the video signal generated based on the NTSC system has a frequency of 30 Hz.

The video-signal-processing device 3 decreases the frame frequency of each of the color-difference signals Cr and Cb of the video signal S1 to one third of what it was, that is, a frequency of 30 [Hz]. Then, the video-signal-processing device 3 externally transmits the color-difference signals Cr and Cb with the decreased frame frequencies and the brightness signal YO with the frame frequency of 90 [Hz].

Figure 3:
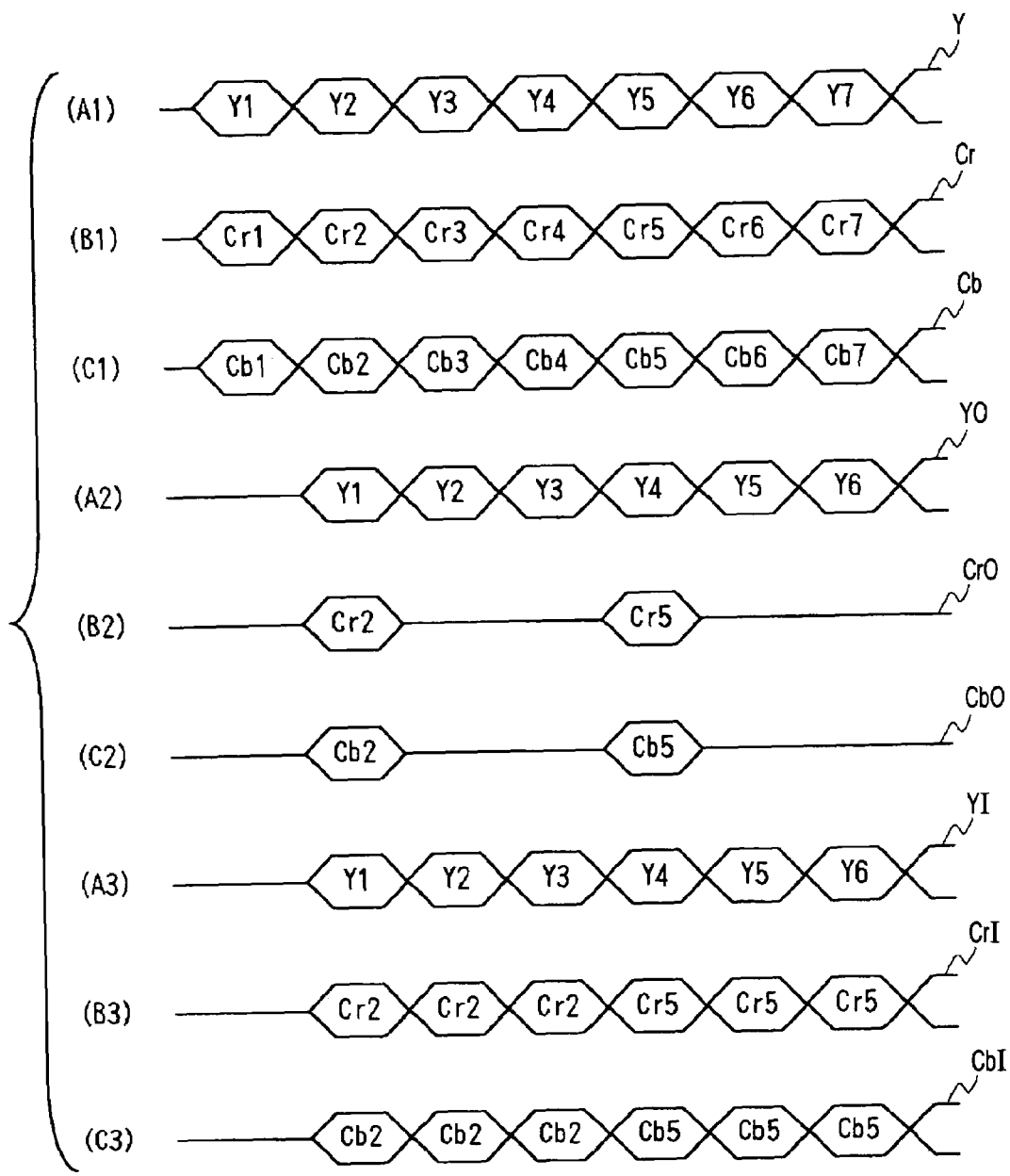
FIG. 3 is a time chart illustrating operations of the video-signal-processing device shown in FIG. 1.

Therefore, in the video-signal-processing device 3, a video-signal-separation unit 7 receives the video signal S1, separates the brightness signal Y from the color-difference signals Cr and Cb, and externally transmits the brightness signal Y, and the color-difference signals Cr and Cb in parallel at the same time, as shown by (A1), (B1), and (C1) shown in FIG. 3. Further, the video-signal-processing device 3 externally transmits synchronization signals SYNC indicating the frame cycle of the brightness signal Y, and the color-difference signals Cr and Cb.

A reduction-control unit 8 counts the synchronization signals SYNC sequentially and cyclically, so as to generate and externally transmit a timing signal indicating the time where the color-difference signals Cr and Cr are transmitted from the video-signal-processing device 3. At that time, the reduction-control unit 8 starts the above-described counting according to a predetermined initial value. Subsequently, according to the first embodiment, where a sequence of frames is divided into at least two sections by the reciprocal of the rate of decreasing the frame frequency of each of the color-difference signals Cr and Cb, the timing signal is externally transmitted only in a single frame at the center of each of the sections, as indicated by (B2) and (C2) shown in FIG. 3.

A memory-controller unit 9 stores the brightness signals Y, and the color-difference signals Cr and Cb that are transmitted in sequence, and externally transmits the stored brightness signals Y, and color-difference signals Cr and Cb under the control of a memory 10. At that time, the memory-controller unit 9 starts transmitting the brightness signals Y based on the timing signals transmitted from the reduction-control unit 8. Namely, the brightness signals Y stored in the memory 10 are externally transmitted in sequence in the order in which the brightness signals Y were stored in the memory 10, as indicated by (A2) shown in FIG. 3. Further, the memory-controller unit 9 selects and externally transmits the color-difference signals CrO and CbO at the time where the timing signals are externally transmitted, as indicated by (B2) and (C2) shown in FIG. 3.

Subsequently, the video-signal-processing device 3 thins out frames of the color-difference signals Cr and Cb when reading the color-difference signals Cr and Cb from the memory 10, so as to decrease the frame frequencies of the color-difference signals Cr and Cb. Further, settings on the frame thinning are made, as below. Namely, where the thinned frames are interpolated by repetitively transmitting the color-difference signals Cr and Cb that are left after the frame thinning is performed, the center value on the time base of frames of the same kind, where each of the frames of the same kind corresponds to either of the color-difference signal Cr and the color-difference signal Cb that are left after the frame thinning is performed, becomes closest to the center value on the time base of at least two different frames of the brightness signal Y corresponding to the color-difference signals Cr and Cb. Therefore, according to the first embodiment, the frame frequency of each of the color-difference signals Cr and Cb is decreased so that the reduced frame frequency corresponds to one third of the frame frequency of the brightness signal Y. Subsequently, the number of the at least two different frames of the brightness signal Y is determined to be three and the first and last frames of the consecutive three frames are thinned out. Subsequently, the center value on the time base of frames of the same kind, where each of the frames of the same kind corresponds to either of the color-difference signal Cr and the color-difference signal Cb that are left after the frame thinning is performed, agrees with the center value on the time base of at least two different frames of the brightness signal Y corresponding to the color-difference signals Cr and Cb. The above-described frame thinning may be performed when data is written into the memory 10, or both when data is written into the memory 10 and when data is read therefrom. Further, as shown in FIG. 3, each of reference character Y indicating the brightness signal, and reference characters Cr and Cb indicating the color-difference signals is provided with a numerical subscript so that each of the reference characters indicates a single frame of each signal.

Subsequently, the video-signal-processing device 3 multiplexes the brightness signal YO, color-difference signals CrO and CbO that are obtained in the above-described manner, and a control signal ST indicating the relationship between the above-described brightness signal YO, and color-difference signals CrO and CbO on one another, and transmits the multiplexed signals, as the video signal S2. Where the above-described processing is performed, the two types of color-difference signals Cr and Cb may be out of phase with each other with respect to the frame thinning. Further, the video-signal-processing device 3 may be configured to switch between the thinning performed for each of the color-difference signals Cr and Cb at the same time and the thinning performed for each of the color-difference signals Cr and Cb so that the color-difference signals Cr and Cb are out of phase with each other according to the quality of a display image produced by the display unit 5, as required.

Figure 4:
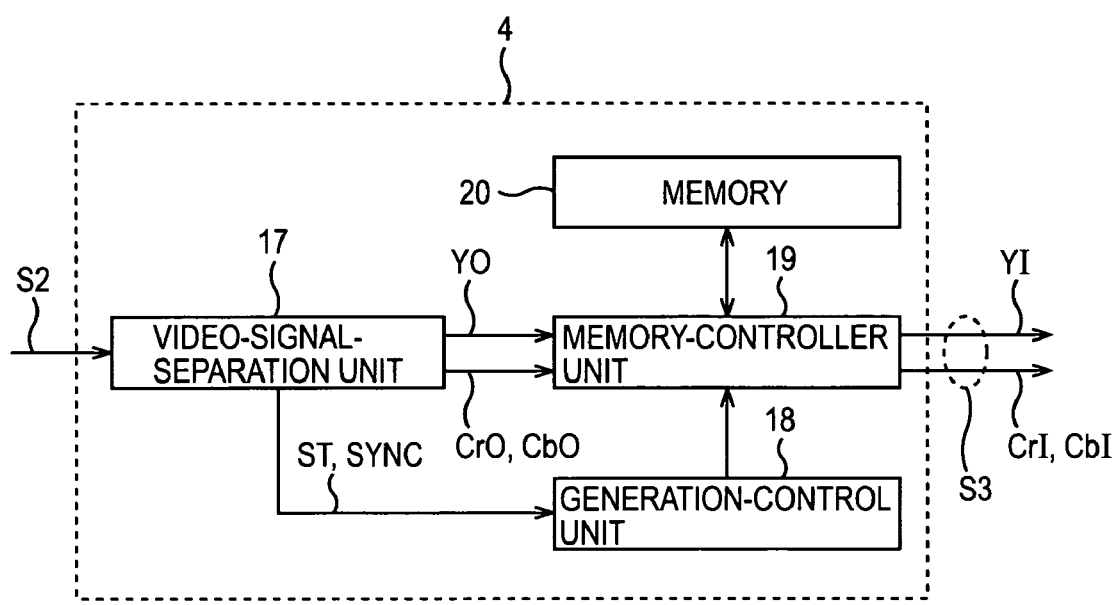
FIG. 4 is a block diagram illustrating a video-signal-processing device provided on the reception side, where the video-signal-processing device is used for the video-signal-transfer system shown in FIG. 2.

FIG. 4 is a block diagram illustrating a video-signal-processing device 4 provided on the reception side. In the video-signal-processing device 4, a video-signal-separation unit 17 receives the video signal S2 transmitted thereto, separates the brightness signal YO, the color-difference signals CrO and CbO, the control signal ST, and the synchronization signal SYNC from one another, and externally transmits the above-described separated signals.

A generation-control unit 18 generates and externally transmits a control signal of a memory-controller unit 19 by counting the synchronization signals SYNC in sequence with reference to the control signals ST.

The memory-controller unit 19 stores the brightness signals YO, and color-difference signals CrO and CbO that are transmitted from the video-signal-separation unit 7, and externally transmits the stored brightness signal YO, and color-difference signals CrO and CbO. When performing the above-described processing, the memory-controller unit 19 externally transmits the brightness signals YO in sequence in the order in which the brightness signals YO were transmitted, as indicated by (A3) shown in FIG. 3, whereby a frame frequency of 90 [Hz] is transmitted from the source 2. Then, the brightness signals YO are transmitted by the frame frequency of 90 [Hz]. On the other hand, as for the color-difference signals CrO and CbO, a single frame Cr2, a single frame Cb2, a single frame Cr5, and a single frame Cb5 that are left, as the result of thinning performed for the color-difference signals CrO and CbO are repetitively read and externally transmitted from a memory 20 according to the control signal transmitted from the generation-control unit 18, as indicated by (B3) and (C3) shown in FIG. 3.

Subsequently, the video-signal-processing device 4 externally transmits a brightness signal YI and color-difference signals CrI and CbI that are transmitted from the memory-controller unit 19 to the display unit 5, as a video signal S3.

Accordingly, the display unit 5 changes a display image by a frame frequency of 90 [Hz] according to the brightness signal YI and color-difference signals CrI and CbI included in the video signal S3. Of the above-described series of processing procedures, delay of the brightness signal YO, which is performed on the transmission side, may be performed on the reception side.

(2) Operations of First Embodiment

In the above-described video-signal-transfer system 1 shown in FIGS. 1, 2, and 3, the video signal S1 with the frame frequency of 90 [Hz] transmitted from the source 2 is divided into the brightness signal Y and the color-difference signals Cr and Cb with frame frequencies of 90 [Hz] by the video-signal-separation unit 7 of the video-signal-processing device 3. The brightness signals Y are transferred to the reception side via the memory-controller unit 9 and the memory 10 in sequence. On the other hand, the color-difference signals Cr and Cb are subjected to the frame thinning so that a single frame of each of the color-difference signals Cr and Cb is assigned to the frames of the brightness signal Y. That is to say, the frame frequency of each of the color-difference signals Cr and Cb is decreased, so as to be lower than that of the brightness signal Y. Then, the color-difference signals Cr and Cb are externally transmitted. Further, settings on the frame thinning are made, as below. Namely, the center value on the time base of frames of the same kind, where each of the frames of the same kind corresponds to either of the color-difference signal Cr and the color-difference signal Cb that are left after the frame thinning is performed, becomes closest to the center value on the time base of at least two different frames of the brightness signal Y corresponding to the color-difference signals Cr and Cb. More specifically, the color-difference signals Cr and Cb are externally transmitted so that the center value on the time base of the frames of the same kind of each of the color-difference signal Cr and the color-difference signal Cb agrees with the center value on the time base of the at least two different frames of the brightness signal Y corresponding to the color-difference signals Cr and Cb.

Accordingly, in the above-described video-signal-transfer system 1, a single frame of the color-difference signal is repetitively transferred, where the frame frequency of the color-difference signal is decreased, so as to correspond to the brightness signal Y corresponding to the color-difference signals Cr and Cb. Therefore, it becomes possible to reduce the occurrence of a blurred edge and a position displacement to a lower degree than in the past by using a simple configuration.

Figure 5:
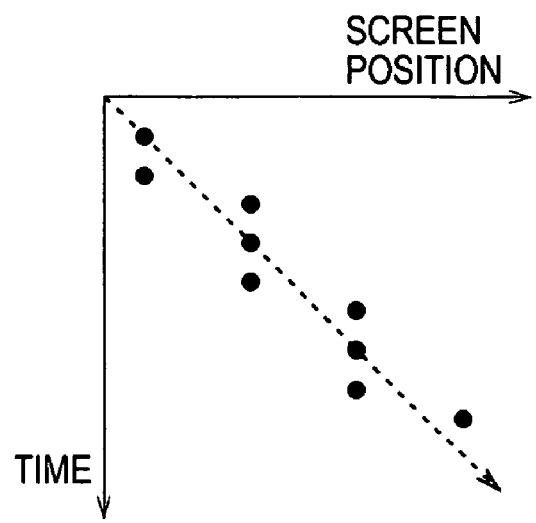
FIG. 5 is a schematic line drawing illustrating a display image produced by the video-signal-transfer system shown in FIG. 2.
Figure 13:
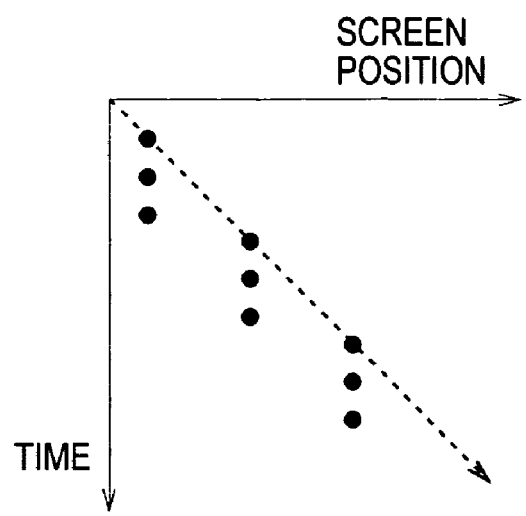
FIG. 13 is a schematic line drawing illustrating the movement of an object image produced when one and the same color-difference-signal frame is repetitively transmitted.

Namely, as shown in FIG. 5 in comparison with FIG. 13, the color-difference signals Cr and Cb are transmitted so that the center value on the time base of frames of the same kind, where each of the frames of the same kind corresponds to either of the color-difference signal Cr and the color-difference signal Cb that are left after the frame thinning is performed, agrees with the center value on the time base of the at least two different frames of the brightness signal Y corresponding to the color-difference signals Cr and Cb. Therefore, where the color-difference signals Cr and Cb are repetitively displayed, the position of a moving object image generated by the color-difference signals Cr and Cb agrees with that of an object image generated by the brightness signal Y in a frame relating to the above-described center value. Further, the moving object image is shown in frames before and after the center-value frame. That is to say, the moving object image is shown before and after the position indicated by the brightness signal.

Figure 6:
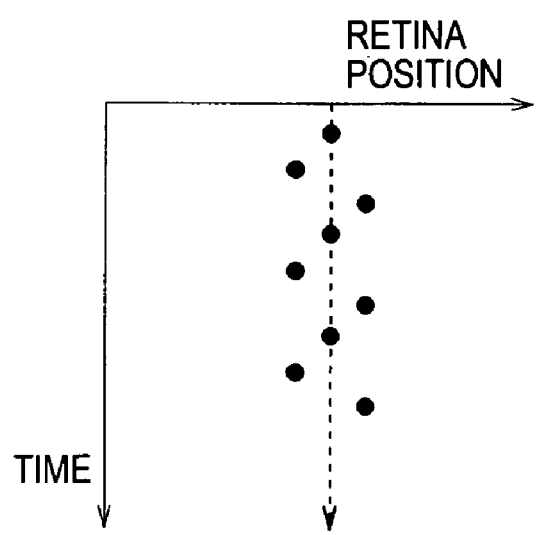
FIG. 6 is a schematic line drawing illustrating the object movement on a retina of a person in the case where the video-signal-transfer system shown in FIG. 2 is used.
Figure 14:
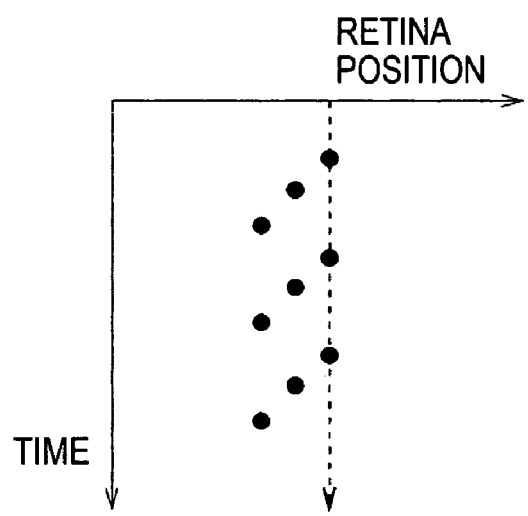
FIG. 14 is a schematic line drawing indicating the edge movement on a retina of a person according to the movement of the object image shown in FIG. 13.

Subsequently, when tracking the object image generated by the brightness signal Y, the object image generated by the color-difference signals Cr and Cb is displaced for each frame, so as to be shown before and after the object image generated by the brightness signal Y on the retina of an audience, as shown in FIG. 6 in comparison with FIG. 14.

As has been described, the center value on the time base of the frames of the same kind, where each of the frames of the same kind corresponds to either of the color-difference signal Cr and the color-difference signal Cb that are left after the frame thinning is performed, agrees with the center value on the time base of the at least two different frames of the brightness signal Y corresponding to the color-difference signals Cr and Cb. Therefore, even though the object image generated by the color-different signals Cr and Cb is displaced with reference to the object image generated by the brightness signal Y, as described above, the center position of the object image generated by the color-different signals Cr and Cb agrees with that of the object image generated by the brightness signal Y in the at least two different frames.

Subsequently, it becomes possible to effectively reduce an unnatural display image caused by an edge-position deviation. Since the deviation of the edge corresponding to the center of displacement is prevented in the above-described manner, it becomes possible to reduce the amount of the deviation of an edge generated by the color-difference signals Cr and Cb with reference to an edge generated by the brightness signal Y. Subsequently, it becomes possible to reduce the occurrence of a blurred edge.

As for the vision of a man, the resolution for a color is lower than that for brightness. Therefore, according to the first embodiment wherein the edge-position deviation is reduced by making the center positions of the color-difference signals agree with the center position of the brightness signal, it becomes possible to make a blurred edge inconspicuous. Subsequently, it becomes possible to produce a display image of a video signal so that the quality of the display image is high enough to be in practical use.

Further, where the single color-difference-signal frame is repetitively shown in the above-described manner and the frame frequency is low, a flicker may occur. However, the vision of a man may not sense a color flicker when the frequency thereof is lower than about 15 [Hz] (D. H. Kelly, "Spatiotemporal variation of chromatic and achromatic contrast threshold", Journal of the Optical Society of America, 64, 983-990, 1974). Subsequently, the first embodiment can reduce the color-flicker occurrence by setting the frame frequency of each of the color-difference signals Cr and Cb to 24 [Hz] or higher.

More specifically, where one and the same color-difference-signal frame is repetitively shown, the blur amount of the edge generated by the color-difference signals with reference to the edge generated by the brightness signal Y becomes equivalent to the amount of the movement of a line of sight tracking the edge generated by the brightness signal Y, where the edge of the brightness signal Y is displaced during the color-difference signals Cr and Cb are repetitively shown. Subsequently, the blur amount [deg] is shown by the expression:

blur amount [deg]=movement speed [deg/sec]×color-difference-signal-repetition period [sec].

Here, it has been reported that the maximum value of a panning speed for an ordinary video signal is 20 [deg/sec] (Kato et al. "The analysis of camera work and sightline movement of broadcast photographer shooting studio program" The Journal of The Institute of Television Engineers of Japan Vol. 49 No. 8 pp. 1023-1031, 1995).

Accordingly, where an object moving with the above-described angular speed is shown with a frame frequency of 120 Hz, and one and the same color-difference-signal frame is assigned to each of consecutive four frames, the amount of a blurred edge becomes 0.3 [deg]. Where the blurred-edge amount is converted to a spacial frequency, the value thereof becomes 1.5 [cycle/deg]. On the other hand, the vision of a man for brightness has a bandpass characteristic which peaks out at 3 [cycle/deg]. Further, the vision of a man for a color has a low-pass-filter characteristic wherein the sensitivity to the color gradually decreases from 0.3 [cycle/deg] (K. T. Mullen, "The contrast sensitivity of human colour vision to red-green and blue-yellow chromatic grating," J. Physiol. 359, 381-400, 1985).

Subsequently, where the edge-blur amount is indicated, as 1.5 [cycle/deg], the edge-blur amount corresponds to an area around the peak of the sensitivity to brightness. As to a color, however, the edge-blur amount corresponds to an area where the sensitivity to the color decreases, which shows that the object image is hardly recognizable due to the blurred edge.

As has been described, in the video-signal-transfer system 1, the color-difference signals with decreased frame frequencies are transmitted to the transfer path with the brightness signal in its original state. Further, the video-signal-processing device 4 on the reception side repetitively reads and externally transmits the color-difference signals stored in the memory 20, whereby one and the same color-difference-signal frame is repetitively assigned to the at least two different frames of the brightness signal corresponding to the color-difference signals. Subsequently, the brightness signal and the color-difference signals are converted into a video signal including a brightness signal and color-difference signals with frame frequencies of 90 [Hz], and a display image of the video signal is produced by the display unit 5.

Subsequently, the video-signal-transfer system 1 allows decreasing the frame frequencies of the color-difference signals while effectively reducing an unnatural edge image, and transferring the color-difference signals, so that the display device 5 produces a high-quality display image of a video signal with a high frame frequency. Therefore, it becomes possible to process a video signal with a high frame frequency with efficiency by using a simple configuration.

Since the video signal is processed in the above-described manner, on the transmission side of the video-signal-transfer system 1, input color-difference signals are transmitted with the frame frequency of a brightness signal and stored in the memory 10. Further, the input color-difference signals are read from the memory 10 and externally transmitted. When the input color-difference signals are read from the memory 10, frames of the input color-difference signals are thinned out so that the frame frequencies of the color-difference signals are decreased. Subsequently, color-difference signals with decreased frame frequencies are generated. Thus, the frame frequencies of the color-difference signals are decreased by performing simple processing relating to memory control.

(3) Advantages of First Embodiment

According to the above-described configuration, one and the same color-difference-signal frame is assigned to each of at least two different frames of the brightness signal so that the center value on the time base of frames of the same kind, where each of the frames of the same kind corresponds to either of the color-difference signal Cr and the color-difference signal Cb that are left after the frame thinning is performed, becomes closest to the center value on the time base of at least two different frames of the brightness signal Y corresponding to the color-difference signals Cr and Cb. Therefore, it becomes possible to process a video signal with a high frame frequency by using a simple configuration while effectively reducing an unnatural edge image.

Further, the input-color-difference signals with the frame frequency of the brightness signal is transmitted and stored in the memory. Where the input-color-difference signals are read from the memory, the frames of the input-color-difference signals are thinned out so that the frame frequencies of the color-difference signals are decreased. Subsequently, the color-difference signals with the decreased frame frequencies are generated. Thus, it becomes possible to decrease the frame frequency of each of the color-difference signals by performing simple processing relating to the memory control.

Further, as has been described, the settings are made so that the center value on the time base of the frames of the same kind, where each of the frames of the same kind corresponds to either of the color-difference signal Cr and the color-difference signal Cb that are left after the frame thinning is performed, becomes closest to the center value on the time base of the at least two different frames of the brightness signal Y corresponding to the color-difference signals Cr and Cb. Subsequently, the video signal is transferred so that one and the same color-difference-signal frame is assigned to each of the at least two different frames of the brightness signal Y. Then, the color-difference signals are stored in the memory and repetitively read therefrom so that one and the same color-difference-signal frame is assigned to each of the frames of the brightness signal corresponding to the color-difference signals. Subsequently, a high-quality-display image of the video signal can be produced by using a simple configuration.

Second Embodiment

Figure 7:
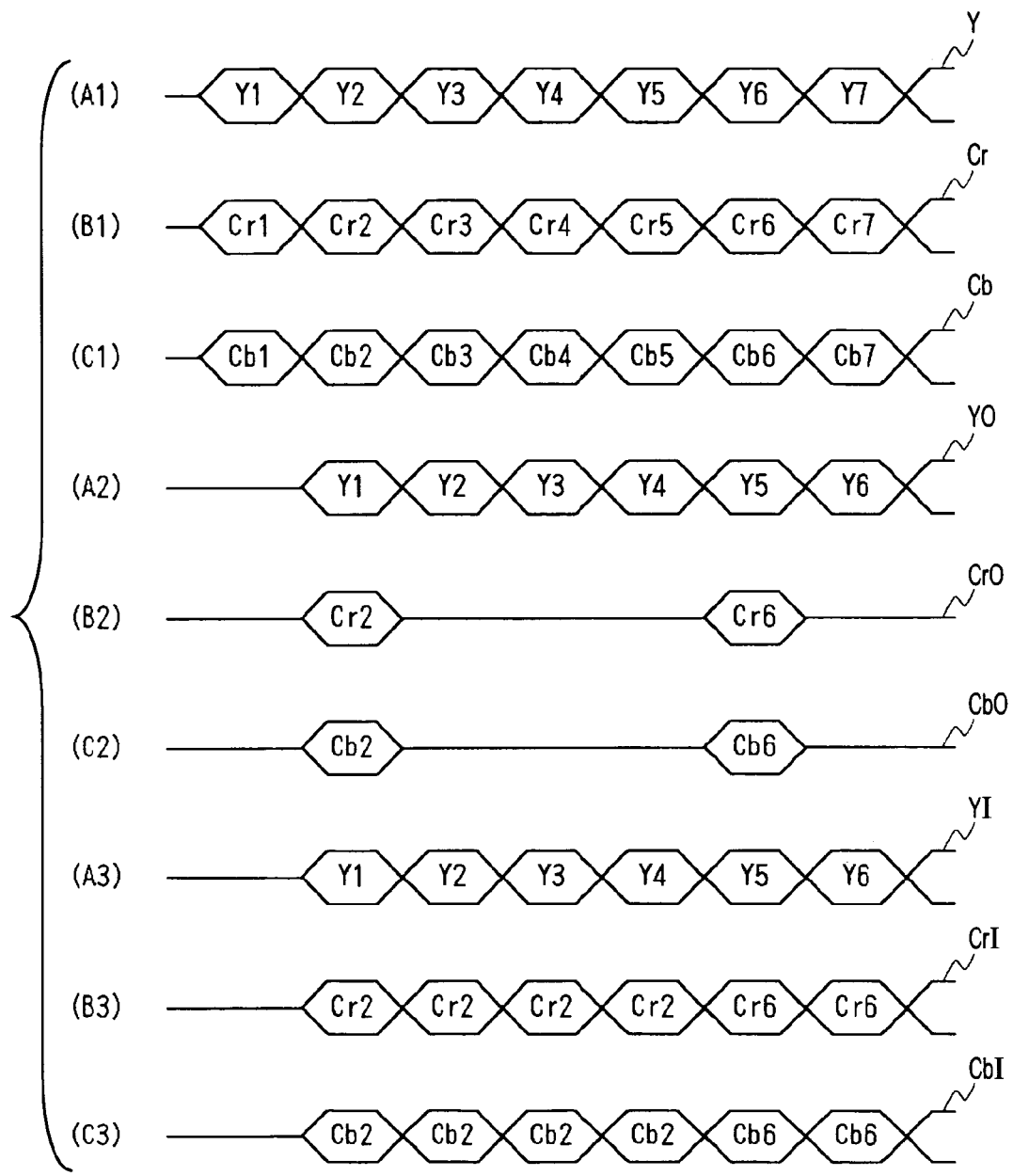
FIG. 7 is a time chart illustrating a video-signal-transfer system according to another embodiment of the present invention.

FIG. 7 is a time chart illustrating processing procedures in comparison with those shown in FIG. 3, where the processing procedures are performed by a video-signal-transfer system according to a second embodiment of the present invention, so as to process a video signal. In the second embodiment, the frame frequency of each of the color-difference signals Cr and Cb is reduced to one fourth of what it was. Namely, a brightness signal YO with a frame frequency of 120 [Hz] and color-difference signals CrO and CbO with frequencies of 30 [Hz] are transferred. Further, the configuration of the video-signal-transfer system according to the second embodiment is the same as that of the above-described video-signal-transfer system 1 according to the first embodiment except that a configuration relating to the frame frequencies of the brightness signal and the color-difference signals to be transferred of the second embodiment is different from that of the first embodiment. Therefore, the configuration of the video-signal-transfer system according to the second embodiment will be described with reference to the configuration according to the first embodiment.

In the video-signal-transfer system, a brightness signal Y, and color-difference signals Cr and Cb with frame frequencies of 120 [Hz] are transmitted from the source 2 to the video-signal-processing device 3, as indicated by (A1), (B1), and (C1) shown in FIG. 7. Then, as is the case with the first embodiment, the frame thinning is performed so that the center value on the time base of frames of the same kind, where each of the frames of the same kind corresponds to either of the color-difference signal Cr and the color-difference signal Cb that are left after the frame thinning is performed, becomes closest to the center value on the time base of at least two different frames of the brightness signal Y corresponding to the color-difference signals Cr and Cb. Subsequently, the frame frequency of each of the color-difference signals Cr and Cb is decreased, whereby color-difference signals CrO and CbO with frame frequencies of 30 [Hz] are generated, as indicated by (A2), (B2), and (C2) shown in FIG. 7.

Where the frame thinning is performed, three frames are removed from four consecutive frames of each of the color-difference signals CrO and CbO. Namely, where each of the color-difference signals CrO and CbO is divided into groups including four frames, either of the two frames indicated by numerical subscripts 2, 3, 5, and 6 corresponding to the center of each of the groups is left after the frame thinning is performed. Subsequently, the center value on the time base of frames of the same kind, where each of the frames of the same kind corresponds to either of the color-difference signal Cr and the color-difference signal Cb that are left after the frame thinning is performed, becomes closest to the center value on the time base of at least two different frames of the brightness signal Y corresponding to the color-difference signals Cr and Cb.

Thus, in the video-signal-transfer system, the consecutive frames are divided into the groups including four frames and the frames are thinned out so that the second frame of each of the group is left, whereby the color-difference signals CrO and CbO with the frame frequencies of 30 [Hz] are generated, as indicated by (A2), (B2), and (C2) shown in FIG. 7. However, the frames may be thinned out so that the third frame of each of the group is left, or the type of a frame left after the frame thinning is performed, is switched between the second frame and the third frame. Further, as has been described in the first embodiment, the color-difference signals Cr and Cb may be out of phase with each other, so as to leave a predetermined frame by performing the frame thinning.

In the video-signal-transfer system, the brightness signal is delayed by as much as the left color-difference-signal frame and externally transmitted. On the reception side, the left color-difference-signal frame is repetitively assigned to the brightness signal so that the frame frequency of each of the color-difference signals agrees with that of the brightness signal, as indicated by (A3), (B3), and (C3) shown in FIG. 7.

In the second embodiment, even though the frame frequency of each of the color-difference signals is reduced to one fourth of what it was and externally transmitted, the center value on the time base of frames of the same kind, where each of the frames of the same kind corresponds to either of the color-difference signal Cr and the color-difference signal Cb that are left after the frame thinning is performed, becomes closest to the center value on the time base of at least two different frames of the brightness signal Y corresponding to the color-difference signals Cr and Cb. Subsequently, the same advantage as that of the first embodiment can be achieved.

Third Embodiment

Figure 8:
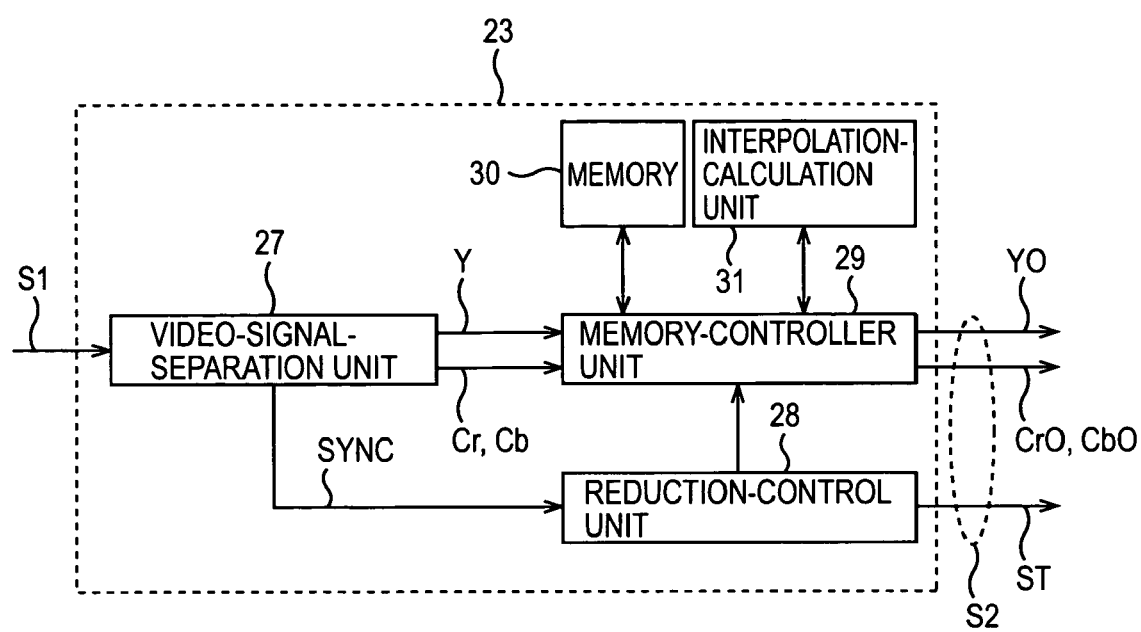
FIG. 8 is a block diagram illustrating a video-signal-processing device provided on the transmission side used for a video-signal-transfer system according to another embodiment of the present invention.

FIG. 8 is a block diagram illustrating a video-signal-processing device 23 used for a video-signal-transfer system according to a third embodiment of the present invention. The video-signal-transfer system has the same configuration as that of the above-described video-signal-transfer system 1 according to the first embodiment except that the above-described video-signal-processing device 23 is used in place of the video-signal-processing device 3 described with reference to FIG. 1. Further, the configuration relating to the video-signal-processing device 23 is different from the corresponding configuration of the video-signal-transfer system 1.

Here, the video-signal-processing device 23 of the third embodiment receives the video-signal S1 including a brightness signal Y and color-difference signals Cr and Cb with frame frequencies of 60 [Hz], the frame frequencies being two times as high as the frame frequency of a video signal generated based on the NTSC system. The video-signal-processing device 23 decreases the frame frequency of each of the color-difference signals Cr and Cb of the video signal S1 to one second of what is was, thereby generating the color-difference signals CrO and CbO, and externally transmits the generated CrO and CbO, and the brightness signal Y, as the video signal S2.

Therefore, in the video-signal-processing device 23, a video-signal-separation unit 27 separates the brightness signal Y, and the color-difference signals Cr and Cb from the video signal S1, transmits the separated signals, and transmits a synchronization signal SYNC.

A reduction-control unit 28 is configured to count the synchronization signal SYNC, thereby generate a reference signal, where the level of the reference signal changes at intervals of two frames of the brightness signal Y, and a control signal ST indicating the relationship between the video signal YO, and the color-difference signals CrO and CbO. Then, the reduction-control unit 28 externally transmits the reference signal and the control signal ST.

A memory-controller unit 29 is configured to store the brightness signals Y, and the color-difference signals Cr and Cb that are transmitted thereto in sequence into a memory 30, and read and externally transmit the stored brightness signal Y, and color-difference signals Cr and Cb. At that time, as for the brightness signal Y, the memory-controller unit 29 reads the brightness signals Y including consecutive frames in the order in which the brightness signals were transmitted and externally transmits the read brightness signals Y at the time corresponding to the color-difference signals CrO and the CbO, as indicated by (A2) shown in FIG. 9. On the other hand, as for the color-difference signals Cr and the Cb, consecutive frames of each of the color-difference signals Cr and the Cb are divided into groups, where each of the groups includes two consecutive frames, and the color-difference signals Cr and Cb are read in parallel at the same time and transmitted to a interpolation-calculation unit 31. The color-difference signals Cr and Cb are processed by the interpolation-calculation unit 31 and externally transmitted therefrom, as the color-difference signals CrO and CbO.

Figure 9:
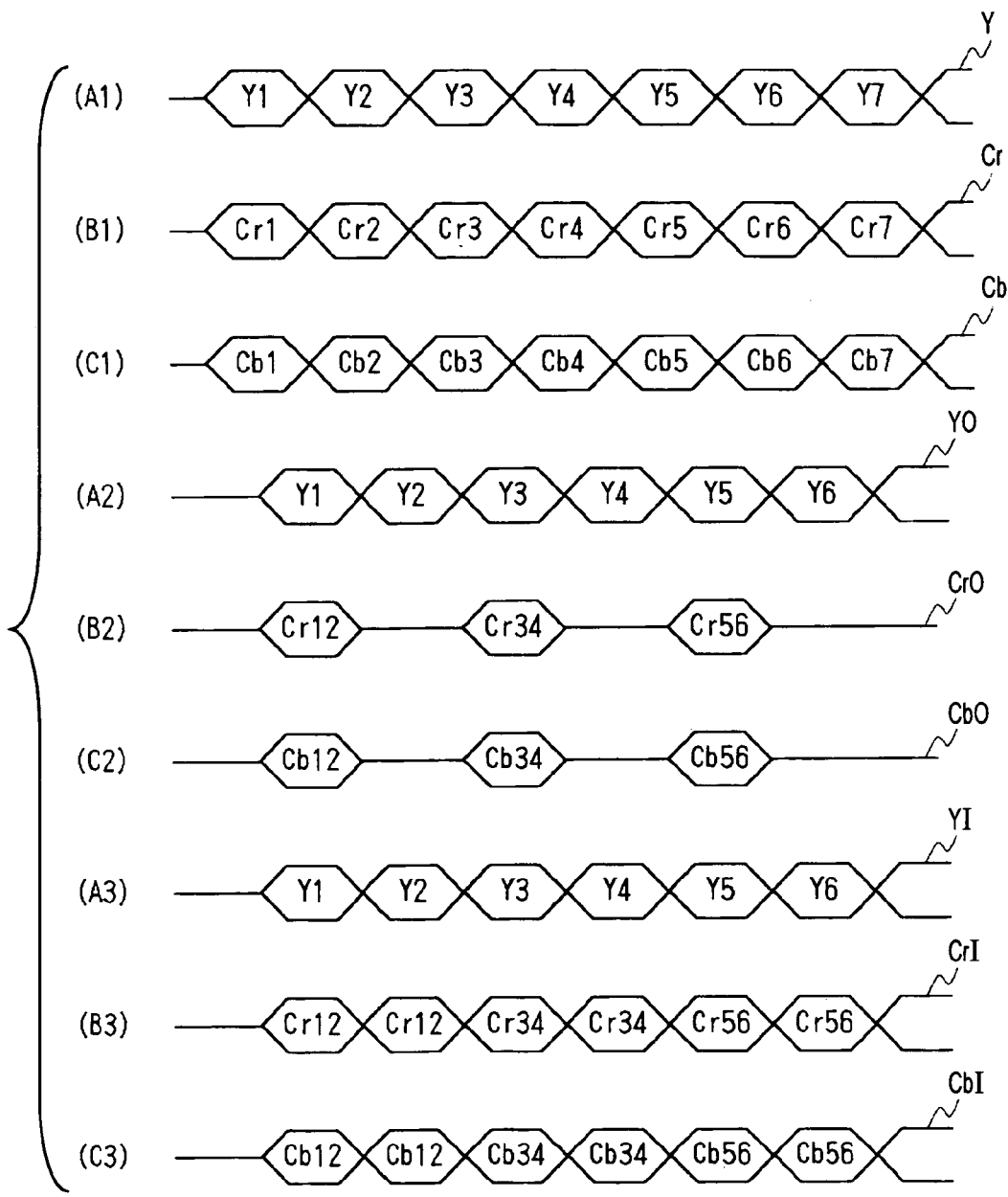
FIG. 9 is a time chart illustrating operations of the video-signal-processing device shown in FIG. 8.

Here, the interpolation-calculation unit 31 performs frame interpolation, as indicated by (B2) and (C2) shown in FIG. 9. Namely, the interpolation-calculation unit 31 interpolates color-difference signals CrO and CbO generated by using the above-described two consecutive frames. Subsequently, each of the color-difference signals CrO and CbO for which the sampling timing is set is externally transmitted, so as to be provided at the midpoint between the above-described two consecutive frames. Here, the above-described frame interpolation is achieved by motion compensation using motion-vector data.

Subsequently, the memory-controller unit 29 delays the brightness signal Y by as much as a predetermined time so that the brightness signal Y is transmitted at the time where the color-difference signals CrO and CbO generated by the frame interpolation are transmitted.

Thus, according to the third embodiment, the frame generated by using the consecutive frames of each of the input color-difference signals Cr and Cb that are stored in the memory 30 is interpolated so that the frame frequency of each of the input-color-difference signals Cr and Cb is decreased. Subsequently, the color-difference signals CrO and CbO are generated. Further, the brightness signal YO and the color-difference signals CrO and CbO are externally transmitted so that the center value on the time base of frames of the same kind of each of the color-difference signals CrO and CbO becomes closest to the center value on the time base of at least two different frames of the brightness signal YO corresponding to the color-difference signals CrO and CbO.

Therefore, in the third embodiment, the color-difference signals CrO and CbO are repetitively read from the memory and assigned to the consecutive two frames, as indicated by (A3), (B3), and (C3) shown in FIG. 9. Subsequently, the display device 5 is driven by a brightness signal and color-difference signals with frequencies of 60 [Hz] so that the display device 5 produces the display image of a video signal. Although each of the color-difference signals is transmitted with a frame frequency reduced to one second of what it was, the two color-difference signals may be out of phase with each other when they are transmitted, as is the case with the first embodiment.

According to the third embodiment, the frame generated by using the consecutive frames of each of the input color-difference signals that are stored in the memory is interpolated so that-the frame frequency of each of the input color-difference signals is decreased. Subsequently, the color-difference signals are generated. Further, the brightness signal and the color-difference signals are externally transmitted so that the center value on the time base of frames of the same kind of each of the color-difference signals becomes closest to the center value on the time base of at least two different frames of the brightness signal corresponding to the color-difference signals. Subsequently, the same advantages as those of the first embodiment can be obtained.

Fourth Embodiment

Figure 10:
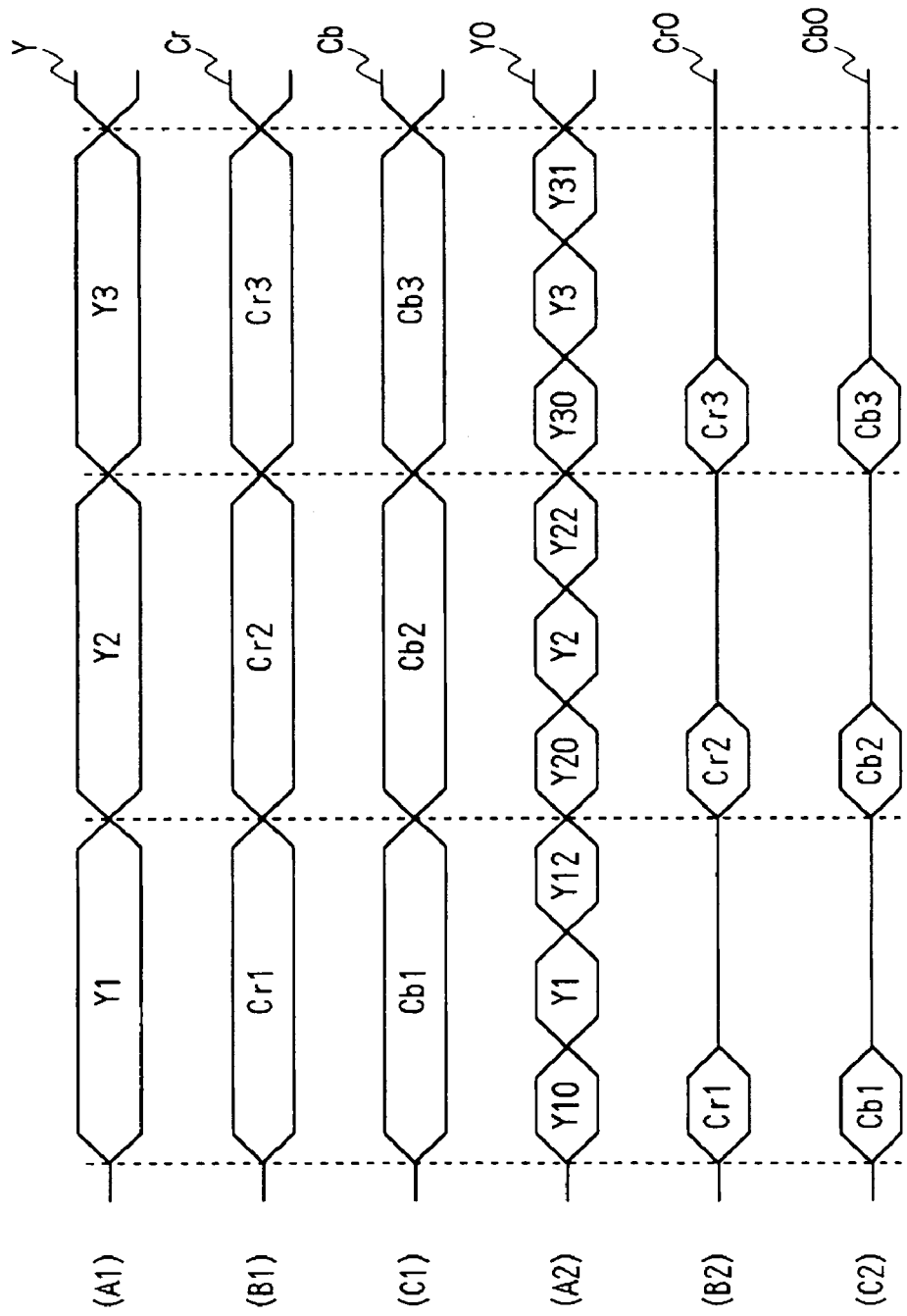
FIG. 10 is a time chart illustrating operations of the video-signal-transfer system including the video-signal-processing device shown in FIG. 8.
Figure 11:
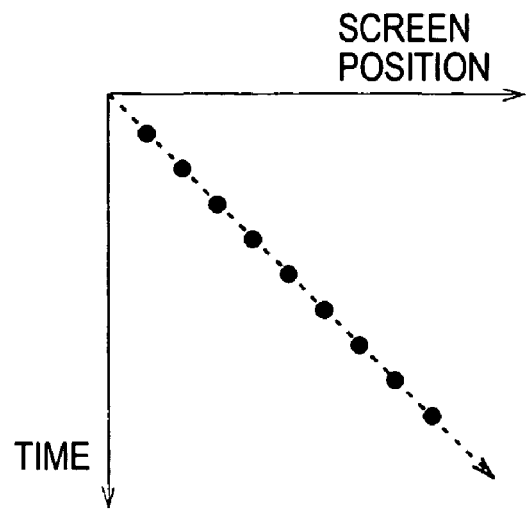
FIG. 11 is a schematic line drawing indicating the movement of an object image produced by brightness signals and color-difference signals.
Figure 12:
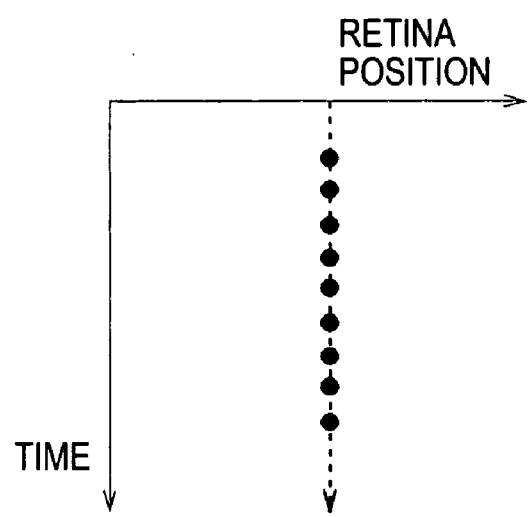
FIG. 12 is a schematic line drawing indicating the edge movement on a retina of a person according to the movement of the object image shown in FIG. 11.

According to a fourth embodiment of the present invention, a video signal with a frame frequency of 30 [Hz] is transmitted, where the video signal includes a brightness signal Y, and color-difference signals Cr and Cb, as indicated by (A1), (B1), and (C1) shown in FIG. 10. Frame interpolation is performed for the brightness signal Y so that the frame frequency thereof is increased. Then, the brightness signal Y, and the color-difference signals Cr and Cb in its original states are externally transmitted. Subsequently, in the fourth embodiment, the brightness signal is processed so that the frame frequencies of the color-difference signals become lower than that of the brightness signal. Then, the brightness signal and the color-difference signals are externally transmitted.

Thus, the frame interpolation is performed for the brightness signal, as indicated by (A2), (B2), and (C2) shown in FIG. 10, so that the center value on the time base generated by a single frame of each of the color-difference signals becomes closest to the center value on the time base generated by at least two frames of the brightness signal corresponding to the color-difference signals.

Further, where the frame frequency of each of the color-difference signals is reduced to one even-numbered fraction of the frame frequency of the brightness signal, all of the frames of the brightness signal may be generated by performing frame interpolation according to the time where the corresponding sampling is performed. Otherwise, the frame interpolation for the color-difference signals described in the second embodiment may be performed.

Subsequently, according to the fourth embodiment, the brightness signal generated in the above-described manner and the color-difference signal with the frame frequencies lower than that of the brightness signal are processed on the reception side in the same manner as those in the first to third embodiments.

According to the configuration of the fourth embodiment, frame interpolation is performed by using an input-brightness signal with the frame frequency of a color-difference signal. Therefore, even though a brightness signal is generated by increasing the frame frequency of the input-brightness signal, the same advantages as those of the first embodiment can be obtained.

Fifth Embodiment

According to a fifth embodiment of the present invention, the configuration relating to the brightness signal and the color-difference signals on the transmission side according to the fourth embodiment is provided on the reception side so that a video signal including a brightness signal and color-difference signals with frame frequencies of 30 [Hz] is converted into a video signal including a brightness signal and color-difference signals with frame frequencies of 60 [Hz], 90 [Hz], or 120 [Hz] and displayed on the reception side. In that case, the above-described configuration may be provided in a display device, as a single-piece unit.

Subsequently, a video-signal-processing device on the reception side according to the fifth embodiment performs frame interpolation by using an input-brightness signal with a frame frequency of 30 [Hz]. Therefore, the frame frequency of the input-brightness signal is increased so that the center value on the time base of a single frame of each of the color-difference signals becomes closest to the center value on the time base of at least two frames of the brightness signal corresponding to the color-difference signals. Subsequently, a brightness signal is generated. Further, input color-difference signals are stored in a memory and read therefrom repetitively. Therefore, frames of one kind of the color-difference signal are assigned to the brightness signal including the frames corresponding to the single frame so that the frame frequencies of the color-difference signals agree with the frame frequency of the brightness signal.

The fifth embodiment can achieve the same advantages as those of the first to fourth embodiment, even though the frame frequency of each of the brightness signal and the color-difference signals is increased on the reception side.

Sixth Embodiment

According to the above-described embodiments, the frame interpolation is performed based on the motion compensation using motion-vector data. However, according to a sixth embodiment of the present invention, the frame interpolation may be achieved by performing weighted addition of pixel values of at least two frames, without being limited to the above-described embodiments.

Further, according to the above-described embodiments, the frame frequency of each of the color-difference signals is reduced to an integral submultiple of that of the brightness signal. However, the sixth embodiment allows establishing a non-integer-related relationship between the frame frequency of each of the color-difference signals and that of the brightness signal, without being limited to the above-described embodiments. For example, where assignment of a single frame of each of the color-difference signals to three frames of the brightness signal and assignment of the single frame of each of the color-difference signals to two frames of the brightness signal are performed alternately, the frame frequency of each of the color-difference signals is changed and set to one and five tenths of the frame frequency of the brightness signal, for example. Thus, the sixth embodiment allows establishing various relationships other than the integer-related relationship by changing the method of assigning the color-difference signal to the brightness signal, as required.

Further, according to the above-described embodiments, frames of the same kind of each of the color-difference signals are sequentially assigned to the consecutive frames of the brightness signal. However, without being limited to the above-described embodiments, the details on the assignment to the consecutive frames may be changed according to a scene change. Namely, the scene change is detected on the reception side and the details on assignment of the color-difference signals to the brightness signal may be changed according to the detected scene change. Subsequently, when the scene change occurs, it becomes possible to assign color-difference signals to the brightness signal corresponding to the color-difference signals, whereby the quality of a display image of a video signal including the brightness signal and the color-difference signals is increased. Otherwise, without performing the above-described processing on the transmission side, the details on the repetitive assignment of the color-difference signals to the brightness signal may be temporarily changed according to a scene change on the reception side.

Further, according to the above-described embodiments, the frame frequency of a video signal is changed. However, without being limited to the above-described embodiments, where a video signal is generated by using computer graphics or the like, the sixth embodiment allows directly generating a brightness signal with a predetermined frame frequency and color-difference signals with frame frequencies lower than that of the brightness signal so that the center value on the time base generated by frames of the same kind of each of the color-difference signals becomes closest to the center value on the time base generated by at least two frames of the brightness signal corresponding to the color-difference signals.

It should be understood by those skilled in the art that various modifications, combinations, sub-combinations and alterations may occur depending on design requirements and other factors insofar as they are within the scope of the appended claims or the equivalents thereof.

What is claimed is:

1. A video-signal-processing device configured to externally transmit at least one brightness signal and at least one color-difference signal, where a single frame of the color-difference signal is assigned to a plurality of frames of the brightness signal so that a first frame frequency of the color-difference signal is lower than a second frame frequency of the brightness signal, wherein the first frame frequency is 24 Hz or higher, and wherein the brightness signal and the color-difference signal are transmitted so that a first center value on a first time base generated by the single frame of the color-difference signal becomes closest to a second center value on a second time base generated by the plurality of frames of the brightness signal corresponding to the color-difference signal.

2. The video-signal-processing device according to claim 1, wherein an input-color-difference signal with the second frame frequency is transmitted and written into a memory, wherein the input-color-difference signal stored in the memory is read and externally transmitted, and wherein frame thinning is performed for the input-color-difference signal at the time where the input-color-difference signal is written into and/or read from the memory so that the second frame frequency of the input-color-difference signal is decreased, whereby the color-difference signal is generated.

3. The video-signal-processing device according to claim 1, wherein an input-color-difference signal with the second frame frequency is transmitted and written into a memory, and wherein a frame generated by using consecutive frames of the input-color-difference signal written into the memory is interpolated so that the second frame frequency of the input-color-difference signal is decreased and the color-difference signal is generated.

4. The video-signal-processing device according to claim 1, wherein a frame generated by using an input-brightness signal with the first frame frequency is interpolated so that the first frame frequency of the input-brightness signal is increased and the brightness signal is generated.

5. A video-signal-processing device configured to process at least one brightness signal and at least one color-difference signal, where a single frame of the color-difference signal is assigned to a plurality of frames of the brightness signal so that a first frame frequency of the color-difference signal is lower than a second frame frequency of the brightness signal,
wherein the first frame frequency is 24 Hz or higher,
wherein a first center value on a first time base generated by the single frame of the color-difference signal becomes closest to a second center value on a second time base generated by the plurality of frames of the brightness signal corresponding to the color-difference signal, and
wherein the color-difference signal is stored in a memory, and read and externally transmitted from the memory repetitively so that the single frame of the color-difference signal is repetitively assigned to the plurality of frames of the brightness signal corresponding to the color-difference signal, whereby the first frame frequency of the color-difference signal agrees with the second frame frequency of the brightness signal.

6. The video-signal-processing device according to claim 5, wherein a video signal including the brightness signal and the color-difference signal is displayed, where the first frame frequency of the color-difference signal agrees with the second frame frequency of the brightness signal.

7. A video-signal-processing device configured to receive and process an input-brightness signal and an input-color-difference signal, where a first frame frequency of the input-color-difference signal is equivalent to a second frame frequency of the input-brightness signal,
wherein the first frame frequency is 24 Hz or higher,
wherein a frame generated by using the input-brightness signal is interpolated so that a first center value on a first time base generated by a single frame of the input-color-difference signal becomes closest to a second center value on a second time base generated by a plurality of frames of the input-brightness signal corresponding to the input-color-difference signal, whereby the second frame frequency of the input-brightness signal is increased and a brightness signal is generated, and
wherein the input-color-difference signal is stored in a memory, and read and externally transmitted from the memory repetitively so that the single frame of the input-color-difference signal is repetitively assigned to the plurality of frames of the brightness signal, which makes the first frame frequency of the input-color-difference signal agree with the second frame frequency of the brightness signal, whereby a color-difference signal is generated.

8. The video-signal-processing device according to claim 7, wherein a video signal including the brightness signal and the color-difference signal is displayed.

9. A video-signal-transfer method adapted to transfer at least one brightness signal and at least one color-difference signal, where a single frame of the color-difference signal is assigned to a plurality of frames of the brightness signal so that a first frame frequency of the color-difference signal is lower than a second frame frequency of the brightness signal,
wherein the first frame frequency is 24 Hz or higher,
the video-signal-transfer method comprising the steps of:
externally transmitting the brightness signal and the color-difference signal so that a first center value on a first time base generated by the single frame of the color-difference signal becomes closest to a second center value on a second time base generated by the plurality of frames of the brightness signal corresponding to the color-difference signal; and
externally transmitting the color-difference signal repetitively via a memory on a reception side so that the single frame of the color-difference signal is repetitively assigned to the plurality of frames of the brightness signal corresponding to the color-difference signal, so as to make the first frame frequency of the color-difference signal agrees with the second frame frequency of the brightness signal.

* * * * *